United States Patent

Bornack, Jr. et al.

Patent Number: 4,873,311
Date of Patent: Oct. 10, 1989

[54] WATER DISPERSIBLE POLYAMIDE ESTER

[75] Inventors: Walter K. Bornack, Jr., Amherst, N.Y.; Keith R. McNally, Bedminster, N.J.

[73] Assignee: Union Camp Corporation, Wayne, N.J.

[21] Appl. No.: 152,640

[22] Filed: Feb. 5, 1988

[51] Int. Cl.$^4$ ............................................. C08G 63/02
[52] U.S. Cl. .................................. 528/272; 528/288; 528/295.3; 528/296; 528/300; 528/308; 528/335; 528/350; 528/499; 525/420.5; 525/425; 523/160
[58] Field of Search ...................... 528/272, 288, 295.3, 528/296, 300, 308, 335, 350, 499; 525/420.5, 425; 523/160; 106/20, 27, 30

[56] References Cited

U.S. PATENT DOCUMENTS

| | | | |
|---|---|---|---|
| 3,355,409 | 11/1967 | Bissot | 523/332 |
| 3,776,865 | 12/1973 | Glaser et al. | 528/339.3 |
| 3,778,394 | 12/1973 | Lovald et al. | 528/339.5 |
| 3,844,991 | 10/1974 | Ferraro et al. | 523/307 |
| 4,365,041 | 12/1982 | Okamoto et al. | 525/58 |
| 4,514,540 | 4/1985 | Peck | 524/514 |
| 4,683,262 | 7/1987 | Whyzmuzis et al. | 524/608 |

*Primary Examiner*—John Kight
*Assistant Examiner*—Samuel A. Acquah
*Attorney, Agent, or Firm*—Michael L. Dunn

[57] ABSTRACT

The present invention comprises a water dispersible polyamide ester useful in flexographic ink formulations and Cold Seal Release Lacquers. A high AV polyamide is reacted with a polyol to increase molecular weight via ester formation. The polyamide ester is then reacted with a cyclic carboxylic anhydride. A general formula for the product resin is as follows:

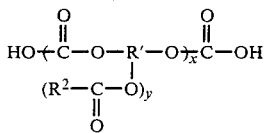

wherein x is an integer of 1–5; R'=a polyamide ester chain of molecular weight 500–2000; where y is an integer of 1–3; $R^2$ is independently at each occurrence the residue of a cyclic carboxylic anhydride bearing at least one free carboxyl group or

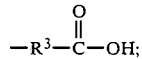

where $R^3$ is independently at each occurrence R' or a polyamide segment of up to 2000 MW.

16 Claims, No Drawings

WATER DISPERSIBLE POLYAMIDE ESTER

BACKGROUND OF THE INVENTION

There are a large variety of inks which are available for use on surfaces, such as metal, fabrics, wood, glass or plastics. Inks in general consist of a vehicle, or carrying agent, and a colorant that is evenly dispersed throughout the vehicle. One particular example of a type of ink is flexographic ink (formerly named aniline ink) which are used on presses with rubber printing plates. Flexographic inks are being used increasingly, especially for package wrappings such as foils, transparent plastic films, or paper-bag machines. They are generally composed of volatile solvents such as low boiling point alcohols, esters, aliphatic and aromatic hydrocarbons, ketones and water.

The most widely used family of flexographic inks are formulated from polyamide resins. Polyamides are formed by combining carboxylic acids, mostly dibasic, with organic polyamines, usually diamines. The acid and amine groups immediately react to form a salt. Upon heating to 140° C. or higher, this salt decomposes with the evolution of water to give an amide bond.

Alcohol soluble polyamides are widely used in alcohol based flexographic inks for printing on plastic film. Environmental concern over the amounts of volatile organic solvents in the atmosphere has led to a desire to use aqueous solutions that have less volatile organic solvents contained therein. In order to meet new Environmental Protection Agency regulations, it is desirable to employ water based flexographic inks with reduced levels of volatile organic solvents. In order to accommodate the reduced levels of volatile organic solvents, the polyamide resins used should have increased water solubility and yet retain other desirable properties of polyamide resins. The major technological difficulty has been in making water dispersible (WD) polyamides which provide inks with good properties such as adhesion, gloss, water resistance, and blocking resistance.

To achieve water dispersibility, it is necessary that the polyamide have a high acid value (AV) in the range of 50–100. When the free acid groups of the resin are neutralized with ammonia, it becomes water soluble. After printing, the ammonia evaporates and the resin develops water resistance.

Making a high AV polyamide using standard synthetic methods presents no problem. It is simply a matter of using a large excess of carboxylic acid over amine in the formulation. The difficulty is that polymer molecular weight is inversely proportional to AV. Therefore, if standard synthetic methods are used, WD polyamides with AV=50–100 are much lower in molecular weight than conventional alcohol soluble polyamides, which usually have acid values of less than 10. This lower molecular weight results in soft, sticky resins with degraded performance. Therefore, the problem is synthesizing polyamides with both high AV and good hardness.

Polyamides which are rendered water dispersible have been described in the prior art literature:

U.S. Pat. No. 3,776,865 to Glaser and Lovald discloses polyamide resins obtained by reacting an acid component comprised of a polymeric fat acid and another dicarboxylic acid with an amine component comprising isophorone diamine or mixtures thereof with an alkylene diamine. At least 12.5 carboxyl equivalent percent of the polymeric fat acid is employed. The patentees disclose that these resins are useful as binders applied by aqueous systems, particularly in flexographic/gravure inks where water reducibility is desired.

U.S. Pat. No. 3,778,394 to Lovald and Glaser discloses that the acid used to make the water dispersible polyamide is largely composed of a rosin acid-carboxylic acid adduct.

U.S. Pat. No. 4,514,540 to Peck, discloses that included in the starting materials of the water dispersible polyamide is a preformed synthetic resin having carboxyl and/or hydroxyl groups.

U.S. Pat. No. 4,683,262 to Whyzmuzis and Menke discloses a method where little or no polymeric fatty acids are used to make the polyamide.

In spite of the wide variety of polyamide containing water dispersible compositions known through the prior art descriptions, there remains a need for improved polyamide compositions which are water dispersible and yet retain the properties of adhesion, gloss, water resistance and blocking resistance.

Polyamides can also be utilized in Cold Seal Release Lacquers which are used in packaging. Cold Seal Release Lacquers (CSRL) were originally developed for the candy bar/chocolate market. Cold seal technology has now expanded into the high growth flexible snack-food packaging industry. Cold Seal Release Lacquers are generally a polyamide or nitrocellulose/polyamide blend system designed to act as a protective coating for the printed sie of a film package. The CSRL must provide gloss and scuff protection to the finished product as well as being block resistant to the cold seal cohesive while the printed film is in roll form. High wind-up tension within the printed roll makes the CSRL/Cohesive interface critical. If the CSRL does not provide a smooth, easy unwind, ink picking, film tearing or difficult machining will occur.

SUMMARY OF THE INVENTION

The present invention comprises a compound having the general formula:

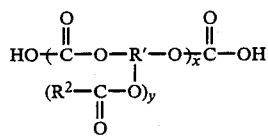

wherein x is an integer of 1–5; R′=a polyamide ester chain of molecular weight 500–2000; where y is an integer of 1–3; R² is independently at each occurrence the residue of a cyclic carboxylic anhydride bearing at least one free carboxyl group or

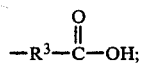

where R³ is independently at each occurrence R′ or a polyamide segment of up to 2000 MW.

The above compound comprises the reaction product of a high AV polyamide and a polyol followed by reaction with a cyclic carboxylic anhydride. The resultant compound is water dispersible and may be a component in various ink formulations as well as CSRL formulations.

More specifically, the resins have proved useful in waterbased cold seal release lacquers (CSRL's) and in flexographic inks both for surface printing and laminate printing. They have been particularly useful in the laminating application where high softening point is especially important.

DETAILED DESCRIPTION OF THE INVENTION

The present invention comprises polyamides with both high acid value and good hardness. Acid value as used in the art is defined as the number of milligrams of potassium hydroxide required to neutralize the free acids present in 1 gram of oil, fat or wax. A general composition of the present invention includes polyamide resins, polyols and cyclic carboxylic anhydrides.

Polyamides in general are formed by combining carboxylic acids with organic polyamines. Polyamines employed in the present invention are organic amines having polyamine functionality and handling properties such as appropriate viscosity to permit use in accordance with the present invention. Especially suitable are one or more of the aliphatic or cycloaliphatic diamines such as those of the formula:

$$H_2N-R'-NH_2$$

wherein R' is an aliphatic or cycloaliphatic hydrocarbon radical. Preferred diamines are hexamethylene diamine (HMDA), m-xylene diamine (MXDA), 1,2-diaminocyclohexane (DCH), isophorone diamine (IPDA) and ethylene diamine (EDA).

The carboxylic acids which may be used in accordance with the present invention are generally dibasic. Dibasic as used in the art are acids having two displaceable hydrogen atoms per molecule. Examples of dibasic acids which may be used are dimer acids, isophthalic acid (IPA), and Westvaco Diacid 1550. Westvaco Diacid 1550 (WV 1550) is a dibasic adduct of acrylic acid and a fatty acid and is essentially 2-n-hexyl-5-(7-carboxyl-n-heptyl)-cyclohex-3-ene carboxylic acid. Dimer acid as used herein is defined as a complex mixture resulting from the polymerization of fatty acids. Representative of these are those that are commercially available from the polymerization of tall oil fatty acids. These have a typical composition as follows:

|  | % by weight |
| --- | --- |
| C$_{18}$ monobasic acids (monomer) | 0 – 5 |
| C$_{36}$ dibasic acids (dimer) | 60 – 95 |
| C$_{54}$ and higher polybasic acids (trimer) | 1 – 35 |

The relative ratios of monomer, dimer and trimer are dependent on the nature of the starting material and the conditions of polymerization. The preferred compositions for the present invention are those that comprise about 82% dimer and 18% trimer.

More specifically, the present invention comprises high AV polyamides. These high AV polyamides have AV's of 50–120, they also contain high levels of isophthalic acid (IPA) and no monofunctional raw materials. In addition, preferred polyamides have an amine value of less than 10 and a softening point between 85° C. and 130° C., softening point as used herein is Ring and Ball softening point. Amine value as used in the art is defined as the milligrams of potassium hydroxide equivalent to the free amine groups in one gram of the polyamide resin so it is analogous to AV. Furthermore, the polyamide resins are terminated on both ends by a carboxyl group.

The composition of the present invention also comprises polyols. The carboxyl groups on both ends of the polyamine resin as disclosed above are reacted with the polyols to build up molecular weight via ester formation.

The amount of polyol added is such that when approximately two-thirds of the hydroxyl groups are esterified, the AV of the resin has been cut in half. Examples of polyols that may be used are trimethylol propane (TMP), glycerine and trimethylol ethane (TME). This list is by no means inclusive. If the polyol used is TMP, this means ideally that two resin molecules have reacted with one TMP molecule. This yields a resin molecule with double the molecular weight and with a free hydroxyl group in the middle.

This free hydroxyl group is then reacted with a cyclic anhydride. Examples of cyclic anhydrides which may be used are trimellitic anhydride (TMA), tetrahydrophthalic anhydride (THPA), phthalic anhydride, succinic anhydride or dodecenyl succinic anhydride. Of course, other cyclic anhydrides may also be used. The hydroxyl group opens the anhydride ring to form the half-ester and create a free carboxyl group. If TMA is used, which has a free carboxyl group to start with, two free carboxyls are formed in the middle of the polymer chain. Therefore, the AV of the final product is similar to that of the starting polyamide. Thus the product resin retains good water dispersibility while gaining improved properties through an increase in molecular weight.

In the preparation of the polyamide compositions of the invention, the reaction mixtures may also include a variety of inert, nonreactive ingredients such as antioxidants, acidic catalysts, antifoam agents and the like.

The following descriptions of the invention are not intended to be limiting in any manner, they are merely illustrative. Various modifications, applications and changes may occur to those skilled in the art without departing from the true spirit and scope of the invention.

As disclosed above, the polyamide resin of the present invention comprises a polyamide resin with a high acid value. This high AV polyamide may comprise between about 67–92 weight percent of the final product. A general formula for the high AV polyamide resin may be as follows:

$$HO-(-\overset{O}{\underset{\|}{C}}-R-\overset{O}{\underset{\|}{C}}-\underset{H}{N}-R^5-\underset{H}{N}-)_n-\overset{O}{\underset{\|}{C}}-R-\overset{O}{\underset{\|}{C}}-OH$$

where R may be in the alternative an aromatic group from IPA or an aliphatic group of greater than about 18 carbon atoms and R$^5$ may be in the alternative an aliphatic group from at least one of IPDA, HMDA, EDA, DCH, MXDA or 2-methyl-pentamethylene diamine; and n is an integer of 1–10. The composition of the present invention also comprises between about 3–11 weight percent of polyols and between about 5–22 weight percent cyclic carboxylic anhydrides.

A general schematic of the synthesis of the product resins of the present invention may be as follows:

$$\text{Diacids} + \text{Diamines} \longrightarrow HO\overset{O}{\underset{\|}{C}}-R^4-\overset{O}{\underset{\|}{C}}-OH \xrightarrow{\text{Polyols}}$$

-continued

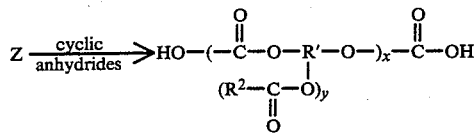

wherein Z is a polyamide ester intermediate formed in the synthesis; x is an integer of 1-5; R'=a polyamide ester chain of molecular weight 500-2000; where y is an integer of 1-3; $R^2$ is independently at each occurrence the residue of a cyclic carboxylic anhydride bearing at least one free carboxyl group or

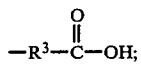

where $R^3$ is independently at each occurrence R' or a polyamide segment of up to 2000 MW; $R^4$ is a low molecular weight polyamide. The polyamide product of the present invention has an acid value of between about 40–100.

Resin Synthesis

The apparatus is a 5-liter flask equipped with a mechanical stirrer, a nitrogen inlet, a thermometer, and a water trap. Dimer acid (1199 grams) and xylene (200 grams) are charged along with traces of phosphoric acid (70 ppm) and silicone anti-foam (1 ppm). The mixture is heated to 70° C. and isophthalic acid (511 grams) is added. The mixture is then heated to 120° C. and a solution of EDA (180 grams) and IPDA (109 grams) is added slowly so that the temperature remains below 130° C. After the amine addition is complete the mixture is stirred at 120°-130° C. for 15 minutes, then heated to 250° C. distilling of xylene and the water of reaction. The resin is stirred at 250° C. until its amine value is below 5. It is then cooled to 210° C.

At 210° C. TMP (109 grams) is added. This temperature is maintained until the AV drops below 55, at which point the resin is cooled to 170° C. TMA (148 g) is then added. After stirring at 170° C. for one hour, the product is discharged. Typically, the properties of the final resin are:

| AV | 85 |
|---|---|
| AmV | 2 |
| Softening Point (R&B) | 115° C. |
| Solution Viscosity (60% NV in n-propanol) | 40P |

Neutralization of the 60% nonvolatile (NV) n-propanol solution with ammonia and dilution with water to 30% NV gives a clear solution with a viscosity of 8P (poise). The product resin as disclosed above is designated herein as EA-5679. This example is essentially repeated except that percentages of components are varied. Preferred resulting resin are shown in Table I, hereunder.

Water-Based Flexographic Ink Preparation

An aqueous flexographic white ink with an EPA-compliant solvent blend (80/20 water/alcohol by weight) was made as follows.

A resin solution is prepared by charging to a blender water (50.5 grams), n-propanol (22.0 grams), ammonium hydroxide (2.5 grams), and EA-5679 resin (25.0 grams). The components are mixed until a clear, particle-free solution is obtained. The pH is adjusted to 8.2–8.9 with ammonium hydroxide.

To this solution (49.0 grams) is added white titanium dioxide pigment (28.0 grams), surfactant (2.0 grams), isopropanol (1.0 gram), and water (20 grams).

This ink can be used to make laminates with polypropylene film and aluminum foil. When used with water-based laminating adhesives, destructive bonds are formed within 24 hours. Destructive bonds as known in the art are bonds which are formed when the two layers of the laminate cannot be separated without tearing of the laminate.

TABLE I

| | Preferred Compositions | | |
|---|---|---|---|
| | EA-5603 Wt % | EA-5608 Wt % | EA-5679 Wt % |
| Dimer acid | — | — | 53.14 |
| WV 1550 | 59.04 | 39.33 | — |
| Isophthalic acid | 14.43 | 16.04 | 22.65 |
| IPDA | — | 4.10 | 4.83 |
| MXDA | 5.21 | 7.21 | — |
| EDA | 10.56 | 3.46 | 7.99 |
| TMP | 4.96 | 9.97 | 4.83 |
| TMA | 5.80 | 19.89 | 6.56 |

What is claimed is:

1. A composition having the formula:

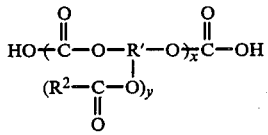

wherein x is an integer of 1-5; R'=a polyamide ester chain of molecular weight 500-2000; where y is an integer of 1-3; $R^2$ is independently at each occurrence the residue of a cyclic carboxylic anhydride bearing at least one free carboxyl group or

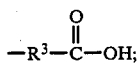

where $R^3$ is independently at each occurrence R' or a polyamide segment of up to 2000 MW.

2. A reaction product comprising:
   about 67–92 weight percent polyamide resin having an acid value of between about 50–150 reacted with about 3–11 weight percent polyols; and then subsequently reacted with about 5–22 weight percent carboxylic anhydrides wherein the reaction product is a water dispersible polyamide.

3. The reaction product of claim 2 wherein the polyamide resin comprises at least one of Dimer acid, 2-n-hexyl-5-(7-carboxyl-n-heptyl)-cyclohex-3-ene carboxylic acid, IPA and polyamines.

4. The reaction product of claim 3 wherein the polyamide resin has the following structure:

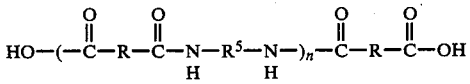

where R may be in the alternative an aromatic group from IPA or an aliphatic group of greater than about 18 carbon atoms and $R^5$ may be in the alternative an aliphatic group from at least one of IPDA, HMDA, EDA, DCH, MXDA or 2-methyl-pentamethylene diamine; and n is an integer of 1–10.

5. The reaction product of claim 3 wherein the polyamines are diamines.

6. The reaction product of claim 5 wherein the diamines comprises at least one of IPDA, MXDA and EDA.

7. The reaction product of claim 2 wherein the carboxylic anhydride comprises at least one of succinic anhydride, dodecenyl succinic anhydride, trimellitic anhydride, tetrahydrophthalic anhydride or phthalic anhydride.

8. The reaction product of claim 2 wherein the polyol comprises at least one of trimethylol propane, glycerine or trimethylol ethane.

9. The polyamide ester of claim 2 wherein the polyol is trimethylol propane and the carboxylic anhydride is trimellitic anhydride.

10. A water dispersible polyamide ester comprising the composition of claim 2.

11. An ink formulation comprising the composition of claim 2.

12. A flexographic ink formulation comprising the composition of claim 2.

13. The lacquer formulation comprising the composition of claim 2.

14. A water based Cold Seal Release Lacquer formulation comprising the composition of claim 2.

15. An aqueous dispersion comprising the composition of claim 1.

16. An aqueous dispersion comprising the reaction product of claim 2.

* * * * *